United States Patent Office 3,552,163
Patented Jan. 5, 1971

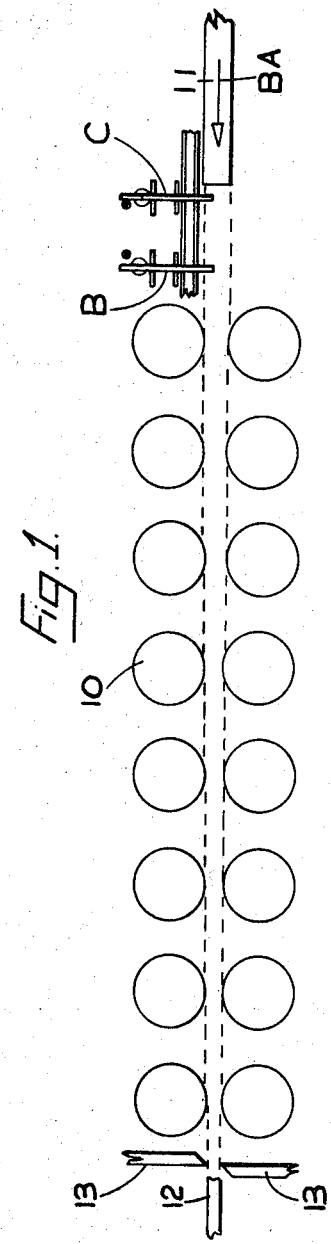
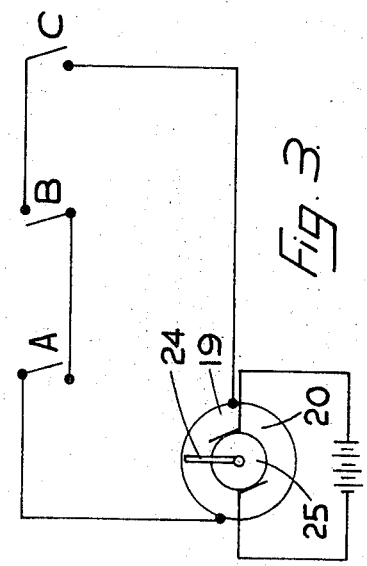
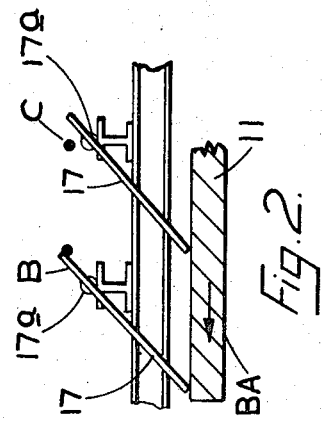

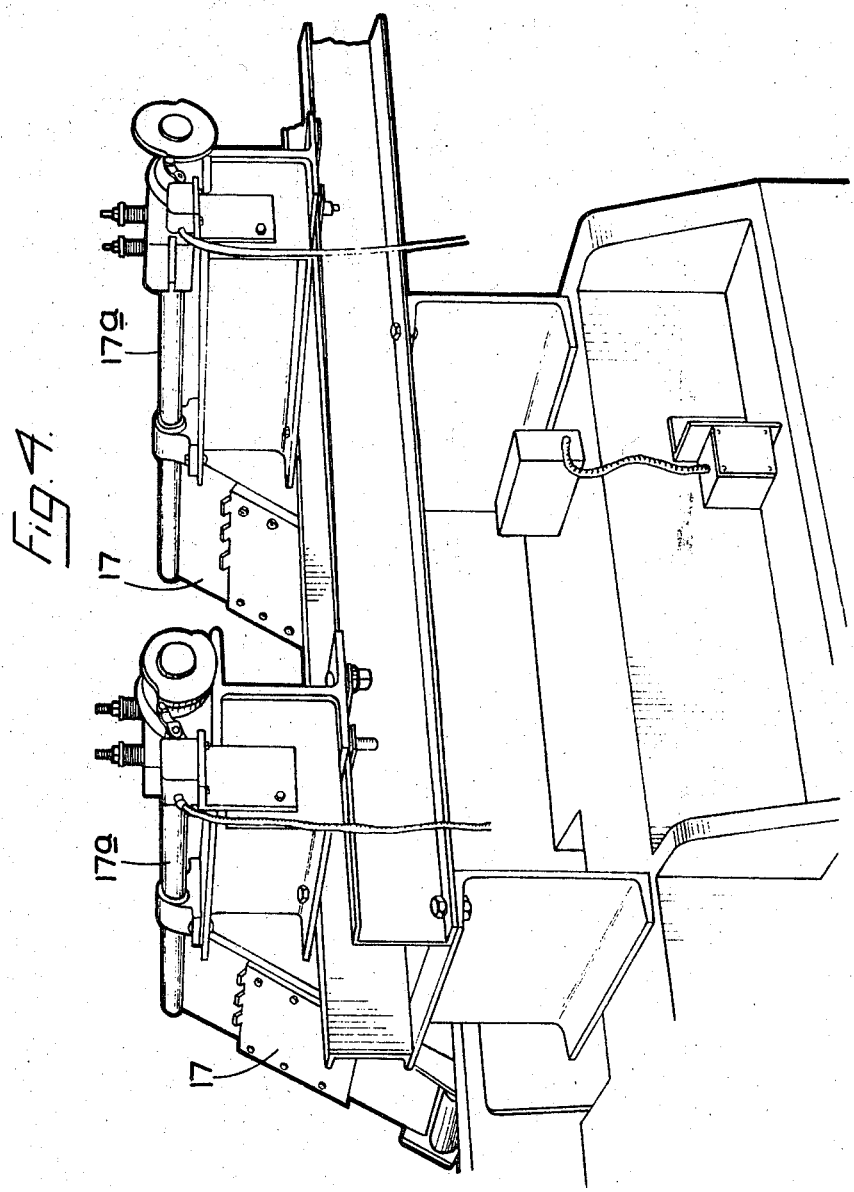

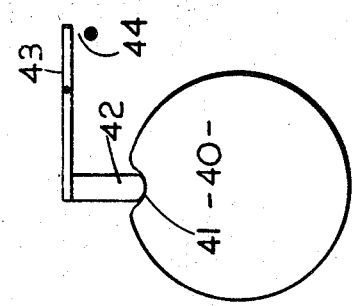
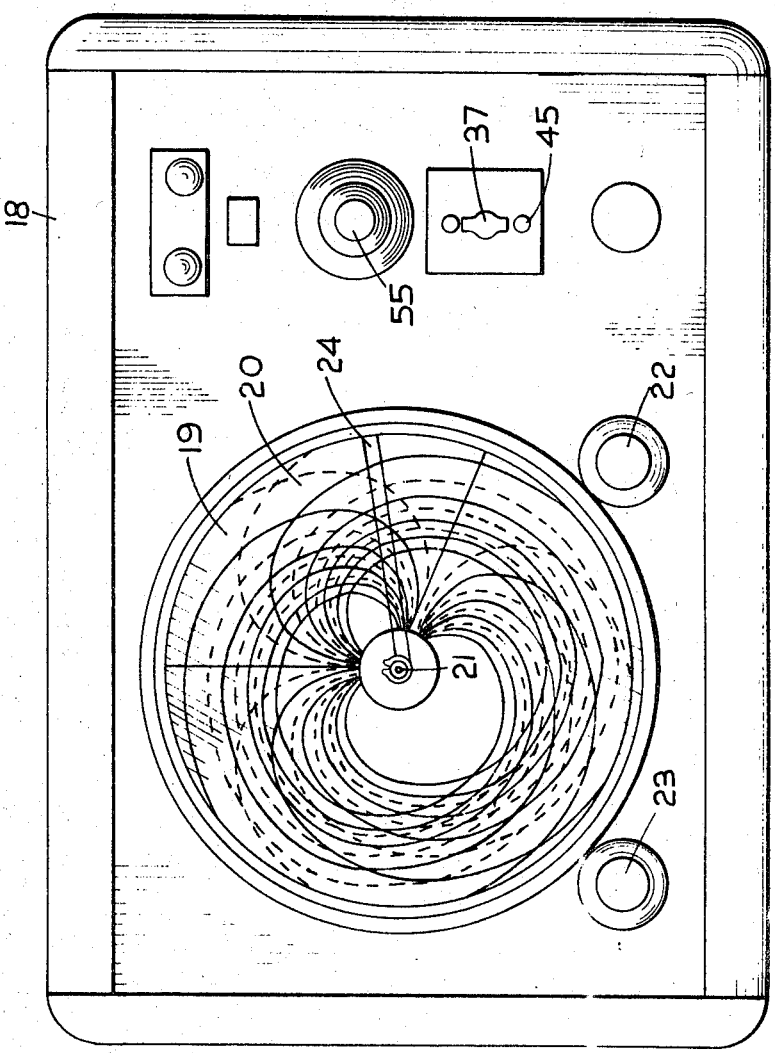

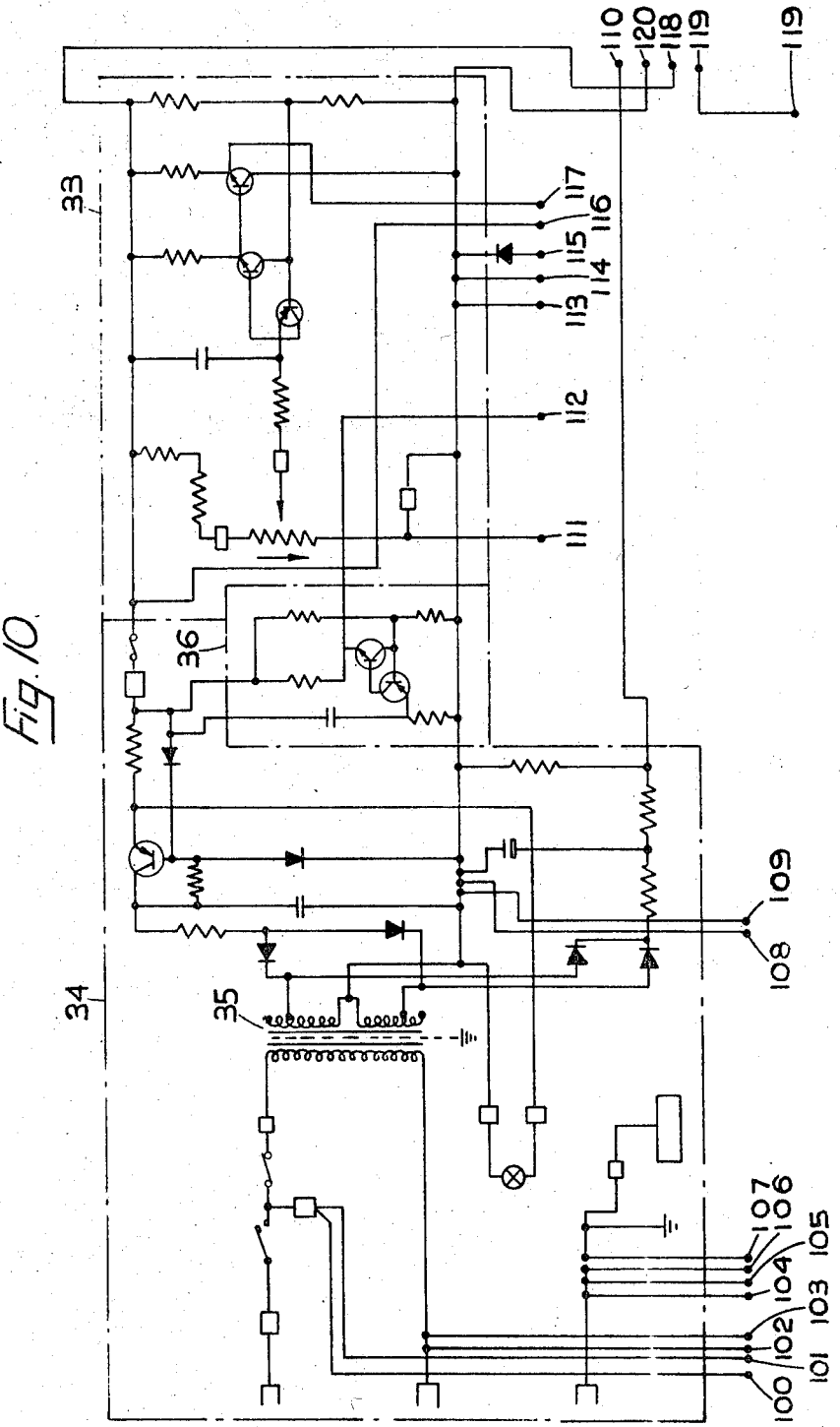

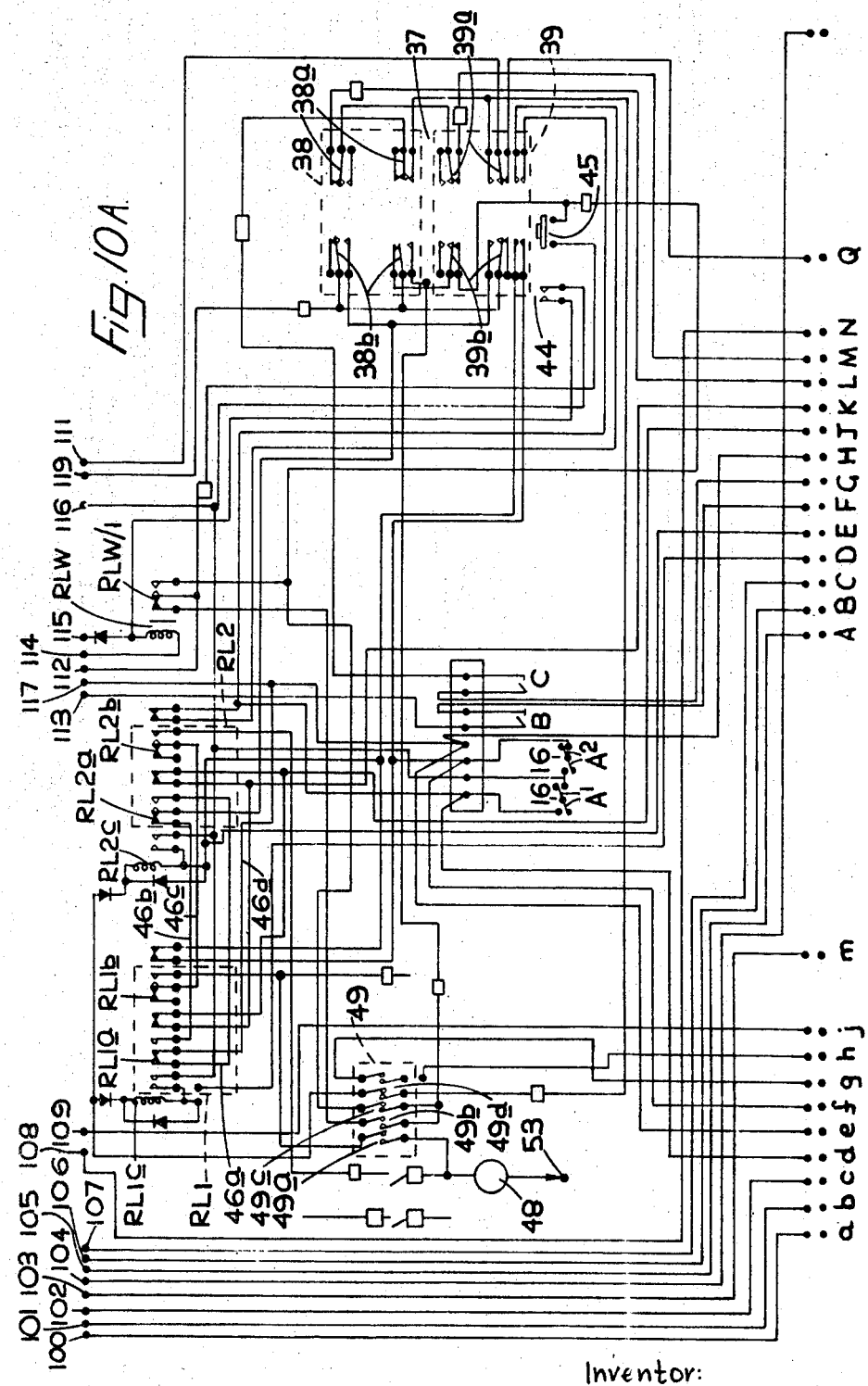

3,552,163
METHOD AND APPARATUS FOR CUTTING METAL BILLETS AND THE LIKE INTO LENGTHS
Henry B. Lloyd, Ty-Luc, Wenvoe, near Cardiff, Wales, assignor to G.K.N. Steel Company Limited, Glamorgan, Wales, a British company
Filed Apr. 29, 1968, Ser. No. 724,756
Claims priority, application Great Britain, Apr. 29, 1967, 19,870/67
Int. Cl. B21b 37/00
U.S. Cl. 72—14          16 Claims

ABSTRACT OF THE DISCLOSURE

Method and apparatus for controlling the cutting into length of metal billets and bars, following the hot rolling thereof, in such a manner as to minimise the amount of scrap left from the bloom or billet which is being rolled.

BACKGROUND OF THE INVENTION

(1) Field of the invention

This invention relates to a new or improved method and apparatus for controlling the severed length of metal billets and bars as they are severed successively by the flying shears at the conclusion of the hot rolling of the billet or bar from a bloom or billet respectively.

(2) Descripiton of the prior art

In the hot rolling of billets and bars from blooms and billets respectively, as hitherto carried out it has not been possible in practice to so sever the billets or bars by the flying shears as, quite apart from the usual unusable rear crop end discard which is cut off before completing the rolling of the billet or bar, to avoid some wastage of metal at the rear end of the bloom or billet respectively, as this emerges from the rolling mill. This is because:

(A) It is not possible precisely to control the mass of each successive bloom or billet, so as to ensure that these are all of precisely the same mass, i.e. containing the same predetermined volume of metal.

(B) Wear of the rolls occurs after a period of time, so that a particular volume of metal which is rolled to a nominal predetermined cross section is variable in length by reason of the actual cross section, differing significantly from the intended cross section.

Thus, after a succession of billets or bars of predetermined identical length are severed by the flying shears from a hot rolled bloom or billet respectively, and in each case of a given nominal cross section, there is left at the rear end of the rolled bloom or billet a billet or bar length having an overall length less than the successive predetermined identical length above mentioned, which rear end billet or bar length is, therefore, of value only as scrap. For example in the production of a succession of 30 ft. long billets from a particular bloom, at the end of the bloom there may result a billet having a length of say 25 ft., i.e. less than the predetermined length, so as to be scrap.

The amount, i.e. length of this scrap end at the rear end of the bloom or billet respectively, forming the billet or bar, may be reduced by cutting the billets or bars within a relatively wide tolerance, e.g. 30 ft.±1 ft., and adjusting the cut length of each billet or bar within the permissible tolerance value, so as within these tolerance limits to cut the maximum possible number of billets or bars from the rolled bloom or billet respectively, with the minimum amount of scrap at the rear end of the bloom or billet.

Hitherto, the adjustment of the operation of the flying shears to effect the foregoing economy in the cutting of the bars or billets within the permissible tolerance limits, has depended on the ability and judgment of the rolling mill operator, in effecting the required adjustment of the frequency of cut of the flying shears, so as to vary the cut length of each bar or billet.

The present invention has for its object the provision of a new or improved method and apparatus by which the billets or bars can with more certainty than heretofore be cut within the permissible tolerances, so as to achieve the desired economy in metal waste.

SUMMARY OF THE INVENTION

The present invention comprises a method of controlling the severing to a predetermined acceptable length of a succession of severed billets or bars after hot rolling in the mill, said method comprising the steps of:

(a) Advancing the first of a succession of blooms or billets through the mill and cutting therefrom by flying shears one or more billets or bars of predetermined length, (b) Measuring such as rolled billet or bar length on an indicating device, so as to calibrate the indicating device for length measurement of the as rolled bloom or billet in relation to the particular cross-section and speed of advancement of the succession of blooms or billets to be rolled, and (c) During the rolling of the next successive bloom or billet, utilising said calibrated indicating device both to measure the as rolled rear crop end length of the bloom or billet and to vary the length of each rolled billet or bar cut by the flying shears, so as to increase or decrease within the acceptable limits, the length of at least the billets or bars last cut by the flying shears from the rolled billet or bar acording to whether the as rolled rear end length of such bloom or billet is less than or greater than the acceptable billet or bar length, so as in the rolling of each successive bloom or billet to obtain the maximum number of sound billets or bars of acceptable length with the minimum amount of wastage.

The invention further comprises apparatus for carrying out the foregoing method, comprising:

(i) An indicating device arranged to measure and indicate the as rolled length of the rear crop end of a bloom or billet, advanced through a hot rolling mill.

(ii) Means responsive to billet or bar advancement for initiating rear crop end length measuring operation of the indicating device following the operation of the flying shears and the passage of the rear extremity of the bloom or billet past the first of two succesive positions at the rear or entrance end of the mill.

(iii) Means responsive to the passage of the rear extremity of the rear crop end past the second of said two successive positions at the rear or entrance end to the mill, for stopping the operation of said length measuring device, so as thereby to measure the rear crop end length expressed as billet or bar length.

(iv) Means for controlling subsequent flying shears cutting operations on the same rolled bloom or billet to adjust by increase or decrease within the acceptable limits subsequent billet or bar lengths, cut from the same rolled bloom or billet and according to whether the indicated as rolled rear crop end length is less than or greater than the acceptable severed billet or bar lengths.

The invention in a more specific form further comprises apparatus for carrying out the foregoing method comprising:

(i) An indicating device embodying a scale carrying member graduated in length units together with a cursor co-operating with said scale carrying member, (ii) Said scale carrying member and cursor, being relatively movable in response to linear advancement of the rolled billet or bar, (iii) Means for starting relative movement of the scale carrying member and cursor following the commencement of the operation of the flying shears and the passage of the rear extremity of the bloom or billet past the first of two successive positions at the rear or entrance end of the mill, (iv) Means responsive to the passage of the rear extremity of the bloom or billet past the second of said two successive positions at the rear or entrance end of the mill for stopping said relative movement between the scale carrying member and cursor, so that said cursor in relation to the scale carrying member indicates the as rolled length of a rear end portion of the bloom or billet, and (v) Means on the scale carrying member for denoting, having regard to such rear end length, and in relation to the number of billets or bars of a predetermined length still to be severed from the bloom or billet, the extent of adjustment of the flying shear operation required to cut, with the minimum of crop end waste, the maximum number of acceptable lengths of billets or bars from the remaining length of the advancing bloom or billet.

By the expression "acceptable length" is herein meant a length corresponding to the desired cut length, but within the permissible tolerance range.

The successful performance of this invention essentially depends upon the fact that in the severing from a bloom or billet of a succession of billets or bars, as these emerge from the mill, a fairly wide length tolerance is allowed, e.g. ±1 ft. (30 cms.) in the case of a 30 ft. (900 cms.) billet, and insofar as a large number of billets or bars commonly twenty or more and certainly not less than five in number, are cut from the one bloom or billet. Thus by adjusting within the permissible tolerance range the severed length in respect of each of these relatively large numbers of billets or bars to be cut, it becomes readily possible to keep the length of the rear crop end as small as possible while severing the maximum possible number of billets or bars of the acceptable length from the bloom or billet which is being rolled.

Thus, if for example the first of say twenty billets, of length 20 ft. (600 cms.) long, was severed successively from the advancing bloom, leaving a potential crop end length as rolled of 11 ft. (330 cms.), with the aid of the indicating device according to this invention, the operator could adjust the operation of the flying shears in severing the remaining nineteen billets to cut these each to a length of about 20 ft. 6 ins. (615 cms.) in each case so as to leave an as rolled crop end length of only 1 ft. (30 cm.)

Although in the performance of the invention, the cursor could be mounted for linear movement in relation to the scale carrying member, preferably the latter is in the form of a dial with the dial and cursor being mounted for relative rotational movement.

BRIEF DESCRIPTION OF THE DRAWINGS

The invention is illustrated in the accompanying drawings wherein:

FIG. 1 is a diagrammatic side elevation of a billet rolling mill incorporating one embodiment of the present invention, and depicting a bloom about to initiate the operation of the control apparatus forming part of this invention.

FIG. 2 is a diagrammatic view of part of the apparatus depicted in FIG. 1, illustrating a further successive stage in the advancement of part of a bloom through the mill.

FIG. 3 is a circuit diagram showing in principle the control of the indicating apparatus of this invention.

FIGS. 4 and 5 are perspective views of portions of a billet rolling mill incorporating the same embodiment of the present invention.

FIG. 6 is a front elevation of one form of indicating device forming part of the apparatus shown in FIGS. 1 to 5.

FIG. 6a is a detail view of part of the apparatus depicted in FIG. 6.

FIGS. 10, 10a and 10b respectively depict parts of the main electric circuit diagram, which controls the operation of the bloom engaging flag switches of the apparatus depicted in FIGS. 1 to 7.

DESCRIPTION OF THE PREFERRED EMBODIMENT

The apparatus illustrated in the foregoing drawings will first be described under a number of sub-headings, after which the general mode of operation of the apparatus will be explained, with reference to the above drawings.

BILLET ROLLING MILL AND FLAG SWITCHES

Referring firstly to FIGS. 1 to 5 of the drawings, in FIG. 1 is depicted diagrammatically a billet rolling mill 10 of generally conventional form for rolling a succession of blooms, in particular steel blooms 11 into billets 12, which billets are severed successively by flying shears of known form, depicted diagrammatically at 13 in FIG. 1, and which serve to sever the rolled bloom into billets 12 of acceptable predetermined length.

Figure 5:
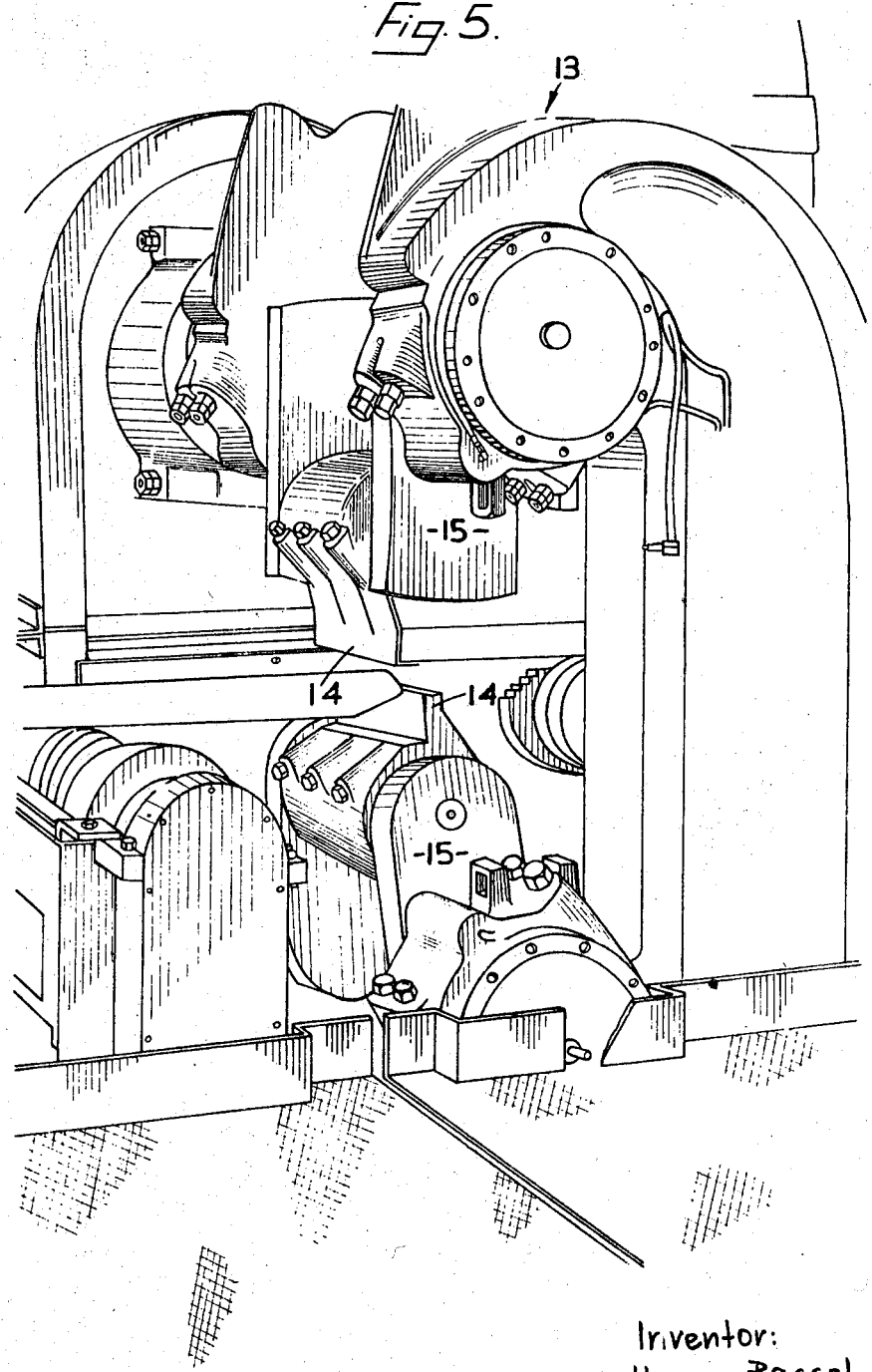

The construction of these per se known flying shears is shown in more detail in FIG. 5, and as will be seen these comprise a pair of shear blades 14 displaced into and out of severing engagement with the rolled bloom, by power driven eccentrics 15 which are intermittently rotated in the known manner. In association with each of these eccentrics 15 is a pair of flying shear switches A1, A2 (FIG. 10A) so arranged that both a switch A1 and a switch A2 is associated with each shear blade driving eccentric, with the two switches A1 in series with one another and with the two switches A2 also in series with one another. Each pair of switches associated with each eccentric 15 has a common operating member 16, the arrangement being such that for each successive billet severing operation by the flying shears, the switches A1 and A2 are closed alternately with switches A1 open when switches A2 are closed, and vice versa. The above described flying shears 13 are disposed in the customary manner at the exit end of the rolling mill 10.

At two successive spaced apart predetermined positions at the entrance or rear end of the rolling mill is arranged one of two bloom engaging flag switches B, C, with the flag switch B disposed nearer to the entrance end of the rolling mill than the flag switch C; i.e., flag switch B is nearer to the mill than flag switch C.

Flag switch C is a normally closed switch opened only by the passage of a bloom 11. Flag switch B is a normally open switch closed by the passage of a bloom.

As shown in FIG. 4, each flag switch comprises a bloom engaging blade 17 mounted on a shaft 17a supported for pivotal movement about a horizontal axis transverse to and above the path of advancement of the bloom, with the blade vertically dependant when not engaged by the bloom. The respective closing and opening movements of the two flag switches B, C, is effected by their blades 17, being engaged by the upper side of the advancing bloom so as to be displaced forwardly and upwardly into a position inclined to the vertical. Each blade 17 is of telescopic construction, so as to be retractable relative to the shaft 17a, thereby permitting of the blades swinging in either direction from a dependant vertical position while still maintaining contact with the in situ bloom. Thus although for the normal forward direction of bloom advancement, arrow BA in FIG. 1, the blade is inclined in such direction from its shaft 17a, the blade will telescope upwardly to an extent sufficient to permit of reversal of the direction of bloom advancement to allow if required of withdrawal of a bent bloom or billet.

Instead of bloom engaging flag switches, photoelectric switches may be provided.

GENERAL DESCRIPTION OF BILLET LENGTH INDICATING DEVICE FOR ADJUSTING THE LENGTH OF SUCCESSIVE BILLETS TO BE CUT FROM A BLOOM

Figure 7:
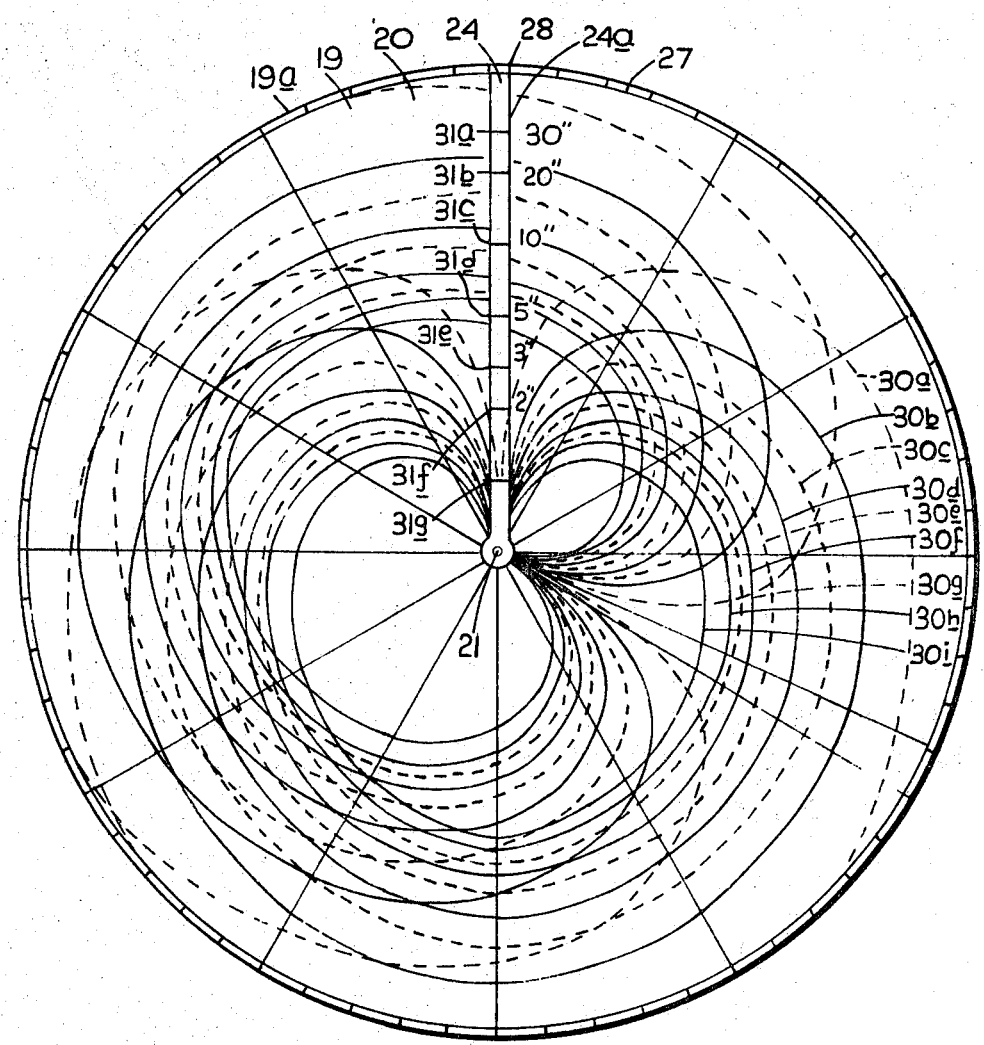
FIG. 7 is a view to an enlarged scale of the dial of the indicating apparatus depicted in FIG. 6.

Reference is now made to FIGS. 6 and 7 of the drawings, and referring firstly to FIG. 6, the indicating device comprises a housing 18 provided with a billet length main adjusting dial 19 and in front of it a transparent short length billet correction dial 20. Each of these two dials is provided with markings of the form more clearly depicted in FIG. 7 for the purpose later to be described. The two dials which are each of circular form, are mounted for independent rotation on a common central pivot 21, rotation being under the control of corresponding dial rotating knobs 22, 23.

The two dials 19, 20 are provided with a transparent rotatable cursor 24 mounted for rotation on pivot 21, the rotational movement being effected by an electric motor 25 disposed within the housing 18; the motor being preferably a pulse actuated electric motor 25 (see FIG. 10b), with the shaft 26 of the motor coupled to the cursor 24.

DESCRIPTION OF PRINCIPLE OF OPERATION OF INVENTION

Before describing in detail the various markings provided on the dials 19 and 20, and on the cursor 24, and which are best shown in FIG. 7, the principle of operation of the apparatus will first be described, with reference to FIGS. 8 and 9.

As earlier explained the object of the invention as applied to the rolling of blooms into billets is to obtain the maximum number of rolled billets of acceptable predetermined length, as hereinbefore defined, from a given size of bloom with the minimum of crop end wastage at the rear end of the bloom so that ideally the crop end wastage is confined to the usual unusable rear crop end discard which in practice would be cut off before the rolling of the bloom or billet into billet or bar form.

First of all in the initial construction of the apparatus, the flag switch B at the rear end of the mill 10 is so positioned in a longitudinal sense in relation to the operative posiiton of the flying shear blades 14, that for a bloom 11 of normal length as opposed to abnormally short length, at the instant that the flying shears 13 make their first cut on the front end of the rolled bloom to crop off the usual front end discard, the rear extremity of the bloom 11 has still to pass flag switch B. As shown in FIG. 8, at the instant that the flying shears make their first cut on the front end of the rolled bloom, the rear extremity of the bloom is spaced rearwardly of flag switch B by a distance $r$. Desirably, although as later explained not necessarily, this distance $r$ is less than the nominal length $l$ of each billet which it is required to cut from the rolled bloom.

Figure 8:
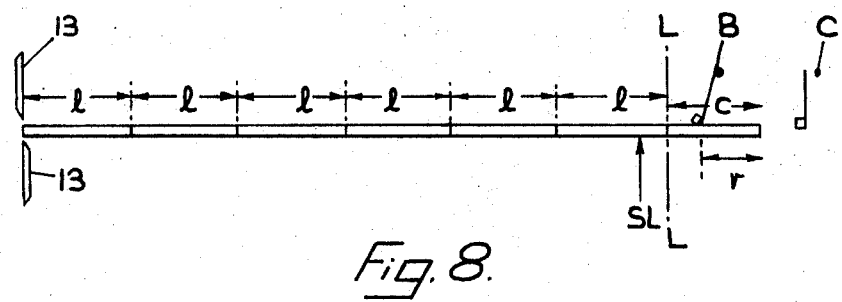
FIG. 8 is a diagrammatic view illustrating the severance of a rolled bloom into a succession of billets of identical length, leaving the rear crop end of variable length at the rear end of the rolled bloom.

Assuming that N number of billets are to be cut by the flying shears from the rolled bloom, so that the nominal length of the rolled bloom to be cut into billets is $N \times l$, then the rear end of the last of the billets to be cut by the flying shears will be cut along the line L—L in FIG. 8, which line in all probability will not at the instant that the flying shears make their first cut on the front end of the billet, be itself aligned with flag switch B.

For instance, as shown, line L—L may be spaced forwardly of flag switch B by a short distance at the instant that the flying shears 13 make their first cut on the front end of the rolled bloom, that is to say line L—L is spaced forwardly of the rear extremity of the rolled bloom by a distance $c$, which from the foregoing description is greater than distance $r$, and which distance $c$ as shown is less than the nominal length $l$ of each billet to be cut from the as rolled bloom.

This distance $c$ represents the as rolled rear crop end length of the bloom, which insofar as it is of a length less than the nominal length of the billet, has hitherto been waste, and which it is now desired to utilise in each of the billets to be cut within the acceptable variations of the nominal length $l$ above mentioned.

It must be emphasised that the whole of this length $c$ is usable in that it represents a rear end length of sound billet, since prior to the advancement of the bloom to the rolling mill, the usual unusable rear end discard will have been cropped off.

In the operation of the apparatus, with each successive bloom to be rolled and cut into billets, the distance $c$ will vary because no two blooms are of the same identical size, even though the variation therebetween may be quite small.

The distance $c-r$ will always be constant for a given constructional position of flag switch B, for a given number of billets N to be cut to a given nominal length $l$. In other words for this given number of billets N, each of given nominal length $l$, at the instant that the flying shears makes its cut at the front end of the first billet, the line L—L will always be spaced at the same distance in relation to flag switch B.

Thus, once the distance $c-r$ has been determined for a particular trial bloom to be cut into N number of billets each of nominal length $l$, then if the distance $r$ can be measured for each successive bloom to be cut into the same number of billets of the same nominal length, the distance $c$ can be determined in respect of each particular bloom, and the as rolled length $c$ utilised in the cutting of each billet, so as to avoid wastage of the rear crop end length $c$ of the bloom.

In principle the length $r$ is measured for each successive bloom by statring the measuring movement of the cursor 24 when the flying shears 13 make their first cut, following the passage of the rear extremity of the bloom past flag switch C and by stopping the movement of the cursor 24 when the rear extremity of the bloom passes flag switch B, and for this purpose as later explained, the preferred electric circuit depicted in FIGS. 10, 10a, 10b and 11 is so arranged that operation of the flying shears 13 does not initiate the movement of the cursor 24 until normally closed flag switch C closes following the passage past switch C of the rear extremity of the bloom 11.

The first stage in the operation of the apparatus is to measure for a trial bloom, which is to be cut into N number of billets, each of nominal length $l$, the distance $c-r$, and this is done by recording the length $r$ by the aforementioned movement of the cursor 24 and by actually measuring the length $c$ of a rear crop end from an as rolled trial bloom, which has been cut into N number of billets, each of the precise nominal length $l$. Thus, the distance $c-r$, which is the same for each subsequent bloom as earlier explained, is determined, and it is then only necessary in respect of each subsequent bloom to measure the actual distance $r$ to arrive at the usable rear crop end length $c$.

First of all, however, it is necessary by the advancement of a trial bloom through the mill, to calibrate the speed of rotation of the cursor 24 to the speed of advancement of the rolled bloom through the mill 10, so that the linear, i.e. foot length markings 27 on the periphery 19a of the main dial 19 (see FIG. 7) correspond to successive foot lengths of the rolled bloom. With this calibration effected, the rear extremity of the trial bloom will now, with its unusable rear end discard already cut off, be approaching flag switch C, which it now passes, so that flag switch C closes.

Figure 9:
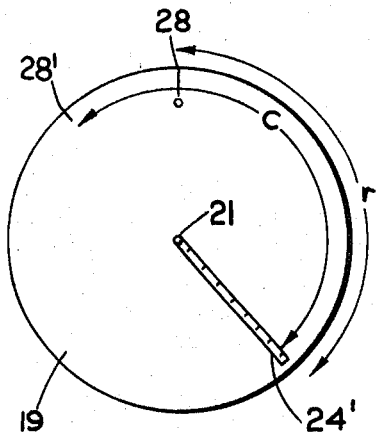
FIG. 9 is a diagrammatic view illustrating the principle of the mode of adjustment of the indicating device in the performance of the invention.

The next successive operation of the flying shears 13 will initiate rotation of the cursor 24 from its initial zero position 28 in FIG. 9. Such rotation of cursor 24 ceases as soon as the rear extremity of the bloom has passed the flag switch B, and consequently at once has effected opening of such flag switch.

Accordingly, the cursor 24 will stop rotating at a position 24' in FIG. 9, when it has traversed a distance $r$ measured at the periphery of main dial 19 corresponding to that length $r$ of the as rolled bloom which though clear of flag switch C was still to the rear of the flag switch B at the start of a flying shear operation on the rolled bloom.

In respect of this trial bloom, a direct measurement is now made of the rear crop end length $c$ as finally cut off by the flying shears.

With this crop end length $c$ known, then assuming that as shown in FIG. 8, the crop end length $c$ is greater than the above mentioned distance $r$ as indicated by the travel of the cursor from position 28 to position 24', the dial 19 can now be once rotated by knob 22 relative to cursor 24 through a distance equal to $c-r$ (see FIG. 8) so as to bring its zero position 28 into a new position 28' in FIG. 9, in which, as measured around the dial periphery 19a it is spaced from the above described final position 24' of the cursor 24 by distance $c$.

This distance $c$ between the new zero position 28' and the position 24' reached by the cursor represents the usable rear end length of the bloom when rolled into billet size and whiuh length $c$ may be greater than or less than the nominal length $l$ of each billet which is being cut from the next successive bloom.

The cursor is now returned to its initial zero position and the operation above described is now repeated in respect of the next successive bloom. This is unlikely to be of the same identical length as rolled as that of the trial bloom, so that in relation to the new zero position 28' of the dial 19, the distance $c$ at which the cursor now stops beyond such new zero position 28' is likely to be different from that of the trial bloom. This new distance $c$ for the next bloom and corresponding to its usable rear crop end length will be observed by the operator after the first or nearly the first cut by the flying shears on the front end of the rolled bloom.

Assuming for example, that this distance $c$ is less than the norminal billet length $l$, then, if there are still "$n$" number of billets of the required nominal length to be cut from the rolled bloom, then in order to make use of this usable length $c$ in the subsequent cutting of this "$n$" number of billets from this same rolled bloom still advancing through the mill, an amount of $c/n$ is at once added to each billet length $l$ by the mill operator. This is done by the mill operator operating on the frequency of operation control invariably provided in any rolling mill for adjusting the frequency of cut of the flying shears and thus varying the length of each severed billet.

To enable the operator at once to effect the required adjustment to the frequency of operation of the flying shears, in respect of the individual billets still to be cut from the advancing bloom, the main dial 19 (see FIG. 7) is marked with a series of curved lines 30a, 30b, 30c, 30d, 30e, 30f, 30g, 30h, 30i, which refer to the number of billets remaining to cut from each given size of bloom, namely 5, 10, 15, 20, 25, 30, 35, 40 and 50 billets from each bloom. This remaining number of billets to be cut will be known to the operator who at the start knows the total number of billets of nominal length which will be cut from a bloom of nominal length and the operator will have counted the number of billets already cut at the time he starts to apply the above described correction by means of the cursor 24 and dial 19. These markings are specific to a particular bloom cross section and rolling mill speed which would in practice be constant for any particular mill.

Also the cursor 24 which is transparent is provided with a series of concentric markings 31a, 31b, 31c, 31d, 31e, 31f and 31g, which as shown, indicate the nature of the adjustment which has to be made to the flying shears control to produce within the acceptable limits the maximum number of billets of predetermined length. Thus the aforementioned markings 31a to 31g inclusive, may correspond respectively to flying shears billet length adjustments of 30 ins. (76 cms.), 20 ins. (51 cms.), 10 ins. (25.4 cms.), 5 ins. (12.7 cms.), 3 ins. (7.6 cms.), 2 ins. (5.1 cms.), and 1 in. (2.54 cms.) in one particular example.

Thus with the cursor 24 at position 24' the flying shears adjustment will be indicated by that cursor line 31a to 31g, which at one edge of the cursor, e.g. the foremost edge 24a in moving to position 24', is in a direction along such edge nearest to the particular curved dial line 30a to 30i appropriate to the number $n$ of billets still to be cut from the bloom. Such reading of the extent of necessary adjustment of the flying shears can be observed at once by a competent operator so as to effect the required flying shears frequency adjustment in time for the next cut of the flying shears.

Thus, if for example referring to FIG. 7, the crop end length $c$ indicated by the cursor 24 is 6 ft. 5 inches (194.7 cms.), and 15 billets remain to be cut i.e. corresponding to curved line 30c, it will be found that the particular cursor marking which is nearest to or intersects dial curved line 30c is cursor marking 31d, corresponding to billet length adjustment of 5 inches (12.7 cms.). This indicates that by adjusting the flying shears to increase the length of cut of each billet by 5 ins. (12.7 cms.), on one billet, i.e. by a total amount of 75 ins. (190 cms.) on 15 billets, the indicated length of 6 ft. 5 inches available crop end, i.e. 77 ins. (194.7 cms.), can be almost fully utilised.

The dial 19 is provided with a double series of markings 30 the two series being on opposite sides of the zero position, with one series being the mirror image of the other. The provision of this second series of markings 30 takes care of the case where the usable length $c$ is so little less than the nominal billet length $l$ that an additional billet can be cut and for this purpose the dial 19 can be adjusted in a rotational direction opposite to that earlier described to produce a negative or less than zero length reading, indicating that it is necessary to reduce rather than increase the length of each billet to be cut within the acceptable limits to enable the length $c$ to be utilised in cutting an extra billet.

According to the selected initial constructional position of the flag switches B and C in relation to one another and to the operative position of the flying shear blades 14 as determined by the nominal overall length of the particular size of as rolled bloom for which the mill is designed, there will be occasions with blooms of length appreciably longer than the overall nominal length when in the operation of the apparatus as so far described, the front end of the rolled bloom will have reached the flying shears, which thereupon operate in the well known normal way on the front end of the rolled bloom to cut off the front crop end and to commence to cut the front end portion of the rolled bloom into billets of the desired nominal length before the rear end of the bloom passes flag switch C. Thus flag switch C will still be open and will not yet permit of the already occurring flying shears operation starting the movement of the cursor 24, to enable the operator to now apply the rear end length correction to the remaining billets still to be cut. This does not matter, because there will still be the same number of "$n$" billets of nominal designed length remaining to be cut at this stage as in the case of a bloom of the intended nominal length, so that the length correction can now be applied by the operator in the precise manner earlier described to the "$n$" number of billets still to be cut to length.

Also, as already mentioned, there may be occasions especially in the cutting of the as rolled bloom into particularly short billets, or if the flag switches B and C are widely spaced in relation to one another, when the usable rear end length c is greater than the nominal billet length l to which the individual billets are being cut, so that the operator can now cut one or more extra billets of the desired length from the bloom, i.e. in total N+1 or e.g. N+2 billets. Although the operator can apply the length correction as shown by the extent of travel of cursor 24 to n+1 or e.g. n+2 number of billets still to be cut; to avoid the delay occasioned by the consequent mental arithmetic, the presence of the extra billets to be cut is taken care of by the provision of the above mentioned short length billet correction dial 20, which is provided with markings 30a to 30i inclusive, similar to those of dial 19.

This second dial 20 is rotatable by knob 22 independently of dial 19 and by rotating it through a peripheral distance corresponding to the nominal aggregated length of the number of billets in excess of the normal number "n" of billets remaining to be cut from the bloom, a rear end usable length c of length less than a nominal short billet length can now be read off by the cursor 24 in relation to dial 20 in the manner already described in relation to dial 19, i.e. by now further rotating dial 20 through a distance equal to c–r (see FIGS. 8 and 9) and thereafter utilising dial 20 in like manner to dial 19 as earlier described in reference to dial 19 for billets of normal length.

To avoid possible confusion between the markings on the two dials, these are differently coloured, e.g. the markings of dial 19 may be black and red and the markings of dial 20 may be green.

As a further refinement of this invention, to avoid the necessity to rotate the dials 19 and 20 by an amount corresponding to the distance c–r (see FIGS. 8 and 9), provision is made for advancing in time the signal produced by the passage of the rear end of the bloom or billet past flag switch B so as to produce a signal from flag switch B at a time interval corresponding to the time taken for the unusable crop end length c to pass flag switch B.

This may be done by physically moving the flag switches B and C further away from the entrance or rear end of the mill though still at such end, so that the distance of flag switch B to the flying shear operative position is greater than the longest bloom to be rolled, thus permitting of the specific mode of operation for short blooms later described herein to be applied to all variations in bloom size likely to be encountered.

In the very simplest form of the invention, a very simple form of electric circuit could be provided as shown in FIG. 3, in which the control for starting operation of the flying shears embodies instead of switches A1 and A2, a single switch A, which closes when the flying shears commence the first of their successive operations on the rolled bloom, the A switch remaining closed until the last billet has been cut. The A switch together with the two flag switches B and C are in series with one another and with the motor 25, which drives the cursor 24, and which motor 25 is provided with an adjustable speed control of known form, so that the speed of rotation of the cursor can be calibrated to indicate on the dial the length of the advancing rear end portion of the as rolled bloom. In such an arrangement with switch B already closed by the presence of the advancing bloom and switch A closed following the start of the flying shears operation, motor 26 will be energised to start the rotation of the cursor 24 as soon as the rear end of the bloom passes flag switch C, so as to close it and complete the motor circuit, and the cursor 24 will stop rotating when the rear end of the bloom passes flag switch B, which at once opens.

Figure 10B:
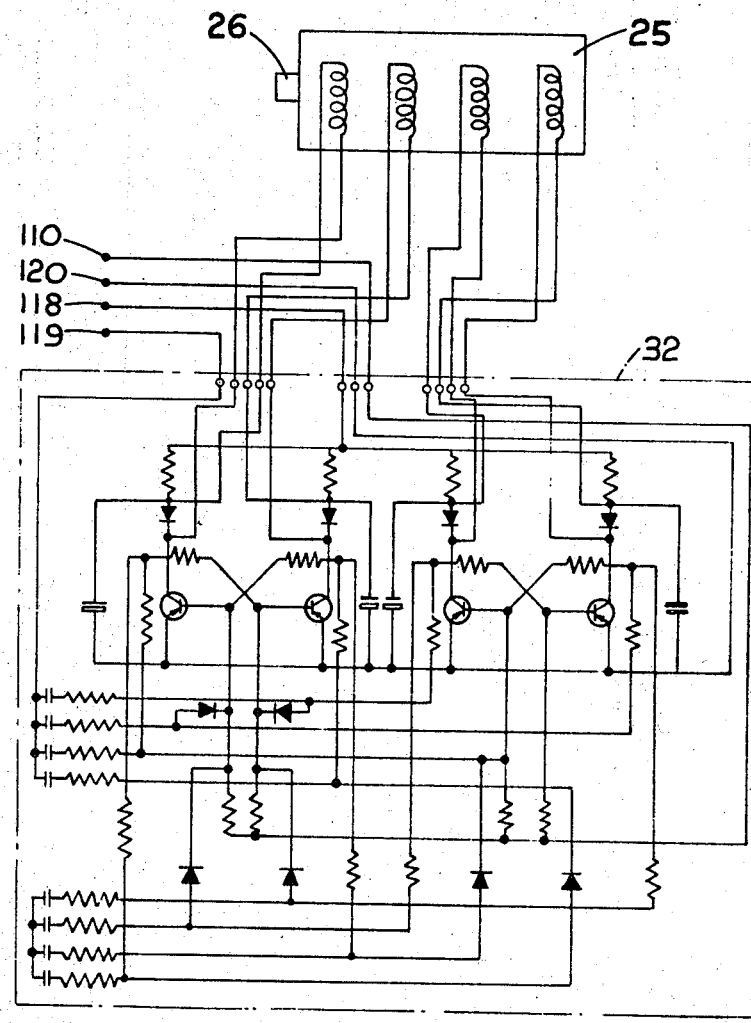

Such an arrangement involves manual resetting of the cursor 24 after the rolling of each bloom, and is generally time consuming in setting up in the first place. Accordingly the apparatus in its preferred form in accordance with this invention is provided with a more elaborate controlling electric circuit, illustrated in FIGS. 10, 10a and 10b, also in FIG. 11 of the drawings, to which reference is now made. This control circuit is of a form well understood by any competent electronics engineer and any extensive description thereof is therefore unnecessary. It is however first mentioned that leads marked A–Q inclusive (omitting J, O and P) in FIG. 10a are connected to correspondingly marked leads A–Q inclusive (omitting I, O and P) in FIG. 11. Other leads on these figures are marked 100 et seq. at their unctions to corresponding leads on adjacent figures forming part of the same circuit diagram.

BRIEF DESCRIPTION OF PREFERRED CONTROL CIRCUIT FOR CONTROLLING OPERATION OF BILLET LENGTH INDICATING DEVICE

Reference is now made to FIGS. 10, 10a and 10b of the drawings, and to the control circuit there depicted. This embodies a pulse splitter 32 of per se known form and constituting no part of this invention, which supplies a succession of pulses to the pulse motor 25, which rotates the cursor 24 of the indicating device depicted in FIG. 6. This pulse splitter circuit is formed as a printed circuit, and receives its input pulses from a main pulse generator 33 of known form, energised by power unit 34 incorporating transformer 35 connected to the current supply mains.

In association with the main pulse generator 33 and energised from the power unit 34 is a re-set pulse generator 36 of per se known form, which controls pulse splitter 32 in such a manner as to operate the pulse motor 25, at a fast speed so as rapidly to re-set to the zero position the rotatable cursor 24 of the indicating device after the rolling of each bloom.

This re-set pulse generator 36 is under the overriding control of a multi-contact three position control switch 37, which is a known form of lever type switch having, see FIG. 6, an intermediate cursor re-set position, a set-up position and an operate position. The contacts of this switch are depicted in FIG. 10a in the re-set condition, and of these contacts, those within the broken line rectangle 38 relate to the setting up of the apparatus for initial operation, and those within the broken line rectangle 39 relate to the position of the switch 37 in the operate condition.

The set-up portion 38 of the control switch 37 embodies two pairs of moving contacts 38a, 38b which in the drawing are displaced in an upward direction so as to bring switch portion 38 into the set-up position to engage the as illustrated broken contacts, while the operate portion 39 of the control switch embodies two pairs of moving contacts 39a, 39b which are displaced in a downward direction in the drawing, to bring switch portion 39 into the operate condition.

In order to retain the cursor 24 in its zero position when it returns thereto, as well as to retain the cursor in such position when it is not required to be displaced into an indicating position as earlier described, the cursor shaft is connected to a cam 40 (see FIG. 6a) provided at a position corresponding to the zero position of the cursor, with a cam dwell 41 which is adapted to receive a detent 42 on an operating member 43 connected to cam switch 44 (see FIG. 10a). The arrangement is such that when the cam switch operating member detent 42 is in register with the cam dwell 41, it is displaced therein under suitable loading means to open the cam switch 44. Except at this one position, correspondig to the zero position of cursor 24, cam switch 44 is maintained closed by the engagement of the switch operating member detent 42, with the periphery of cam 40.

A push-button manual control 45 is provided for overriding cam switch 44, in the event for any reason of the cursor 24 failing to return to the zero position.

Referring again to FIG. 10a, the flying shear switches A1, A2, each serve to control relays RL1 and RL2, which are operated through contacts 49d of the auto reset cam switch 49 (later described) in series with the set-up switch contacts 38a. Each of these relays are so formed as to be latched in by the supply current through its own contacts on receipt of a signal from the flying shears through either switches A1 or A2.

As will be observed from FIG. 10a, each of the relays RL1 and RL2 embody two pairs of switches having two fixed contacts, namely RL1a, RL1b, RL2a and RL2b, and the arrangement is such that the engaged contact of RL1a, RL1b, is connected by one of four leads 46a, 46b, 46c 46d, to the momentarily unengaged contact or RL2a or RL2b respectively. Thus, with switch 37 in the set-up position, i.e. with contacts 38b in the other position to that illustrated, when either one of the two relays RL1, RL2 is made, pulses are fed through the contacts 38b, of set-up switch 38 to the pulse splitter 32, and the cursor 24 is rotated and advanced along the dial 19.

With switch 37 in the operate position so that the operate contacts 39b are now in series with flag switch C the pulse motor will now operate as later described.

With switch 37 in the set-up position, a further signal from the flying shears will operate its other pair of switches A1 or A2, hence energising the other relay RL1 or RL2, thus through set-up contact 38b the pulse feed is broken and the cursor stops at a particular billet length position.

Provision is made for manually adjusting the speed of rotation of the pulse motor 25 by providing the motor in well known manner with a speed adjustment control manually operable by speed control knob 55 (see FIG. 6).

ARRANGEMENT FOR DEALING WITH UNUSUALLY SHORT BLOOMS OF LENGTH LESS THAN THE DISTANCE BETWEEN FLAG SWITCH B AND FLYING SHEARS A1 AND A2

The apparatus is designed to take care of the abnormal case of an unusually short bloom being fed to the mill 10 of a length such that the rear end thereof clears the flag switch B, so as to open this before the front end of the rolled bloom has reached the flying shears 13. With the apparatus as so far described, it would be ineffective to take care of this case of abnormally short blooms, and this is dealth with by the circuitry depicted in FIG. 11, by which under the initial closure of flag switch B, there is produced from a known form of pulse emitter 47 (which as will be later understood serves also as a batch counter), an initial pulse count Z followed by a succession of further pulse counts Y. The Y pulse counts produce output pulses in the circuit controlling the cursor operating motor 25, with the Y pulses repeated at intervals of time equal to the time required by the flying shears to cut successive billets of the nominal length $l$.

The arrangement is such that after the cursor 24 has commenced to move from its zero position or adjusted zero position, consequent on the first cut of the flying shears, the next successive output pulse Y will be effective to stop the further indicating movement of the cursor 24, corresponding to the advancement of the as rolled bloom by a distance equal to $c$, so that the indicating device will still be effective to indicate the usable rear crop end length $c$ earlier described with reference to FIG. 8.

BILLET DEFICIENCY COUNTING DEVICE

Figure 11:
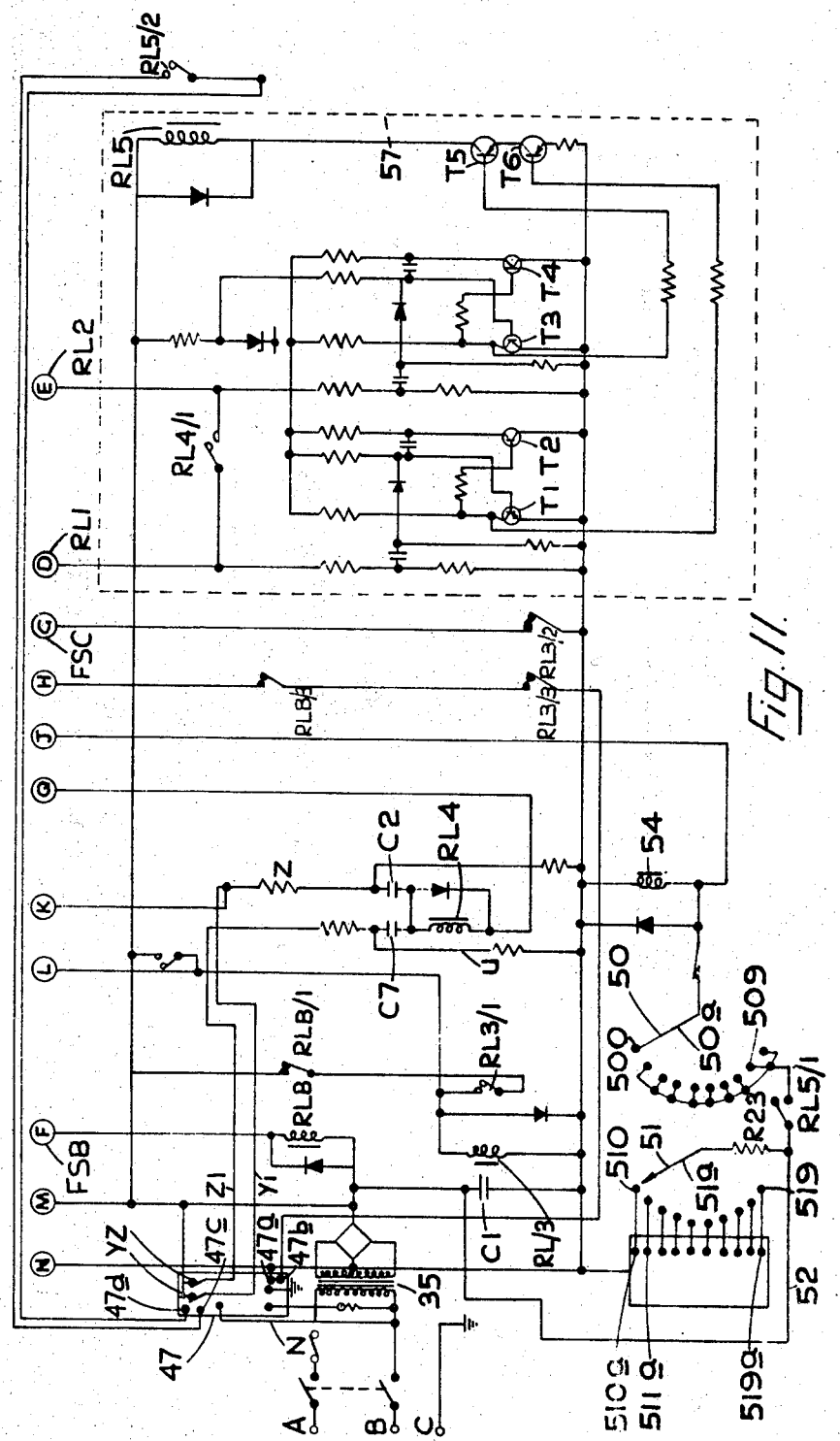
FIG. 11 is a circuit diagram depicting a further part of the electric circuit and associated equipment.

Referring to FIG. 11, provision is made in the case of short blooms for counting and indicating the difference or deficiency between the number of billets actually cut and the nominal number which should be cut from a bloom of the correct length. Such billet deficiency counter is necessary in order that the operator can correctly apply the billet length correction earlier mentioned. For this purpose, the circuit depicted in FIG. 11 incorporates a uni-selector switch 50 and billet number display 51 operated by contacts on RL1 and RL2 and by batch counter 47.

Switch 50 and display 51, referring to FIG. 11, comprise a uniselector with coil 54 which is fed through lead "J" through the contacts of RL1 and RL2 and the batch counter output contacts "Y" (from lead "K"). Each time the uniselector is fed it pulses forward one contact causing the moving arm 51a to make contact with the fixed contacts 510 to 519 in turn thus feeding the display lamps 510a to 519a from the supply which comes via the series resistance R23 to lead 52 direct from capacitor C1. Switch arm 50a and contacts 500a to 509a inclusive provide a homing, i.e. resetting circuit to set the display to zero when contacts RL5/1 are closed; fixed contact 500a having no connection, the uniselector will always come to rest at this point. Thus on the display counter there is indicated the number of billets to be added to those actually cut from the particular short bloom in properly applying the billet length correction.

The reason why the batch counter 47 each time it operates produces an initial pulse count Z followed by a succession of pulse counts Y will be understood in principle with reference to FIG. 8. The necessity for providing an initial pulse count Z arises from the fact that as earlier explained, the total length of the as rolled bloom which is to be cut into billets each of nominal length $l$ is unlikely in practice to be the distance between the point of cut of the flying shears 13 and the position of flag switch B, particularly having regard to variation in billet length which may be required when rolling blooms of a particular cross section into billets of a particular cross section. Thus, pulse count Z is of a duration corresponding to the time taken for the bloom to advance the linear distance between flag switch B and line L—L in FIG. 8. In other words pulse count Z applies a starting correction to the batch counter pulses Y corresponding to the difference between the distance of flag switch B and flying shears 13 and N times each nominal billet length $l$ to ensure that each Y pulse is produced by the batch counter at time intervals correctly related to billets each of the nominal length $l$.

The principle of the foregoing is further explained by a reference to a practical example referring again to FIG. 8, wherein it is assumed that:

The nominal length $l$ of each billet is 10 ft.
Usable rear crop end length $c$ is 8 ft.
Distance $c$–$r$ is 3 ft.

The batch counter which is adjustable in the known manner is adjusted to produce an initial Z pulse for a time corresponding to the bloom to travel an as rolled distance of 3 ft., and the batch counter is further adjusted so as to produce the Y pulses at a time interval corresponding to the time taken for the as rolled bloom to travel a distance of 10 ft. corresponding to the nominal billet length $l$.

Assuming now that a short length bloom is being dealt with so that the front end of the as rolled bloom reaches the flying shears when the rear end of the as rolled bloom is a distance of 5 ft. in front of flag switch B, i.e. has reached the position S–L in FIG. 8 when the flying shears commences to operate, then to reproduce the nominal billet length conditions for correctly operating the cursor 24, the batch counter must now product the Y pulse after a further time interval corresponding to an as rolled billet advancement of 8 ft., which is the distance $c$ in the example above quoted. Thus, for a nominal billet length of 10 ft. the Y pulse will be produced at the correct time interval following the initial Z pulse.

The Z pulse serves to permit of the flying shears starting the pulse motor despite the rear end of the bloom having already passed flag switch B and the aforementioned first following Y pulse at the time interval aforementioned serves to stop the motor driving the cursor 24. Thus, the correct distance c will be displayed by the movement of the cursor, while the billet deficiency indicator will in this case show a billet deficiency number of one.

The batch counter 47 is provided with a pair of input terminals 47a, 47b respectively connected through lead N to the centre terminal of the output side of transformer 35, and through relay contacts RL3/3 and RLB/3 in lead H to the main pulse generator 33, from which through these relay contacts the batch counter can receive input pulses from the main pulse generator.

The batch counter is provided with a pair of output terminals Z, Y, each connected to lead M, which through its connection to the control switch set-up contacts 38a ensures that the batch counter is inoperative when the control switch contacts are in the reset position, as illustrated.

These batch counter output contacts Z, Y are also connected respectively through leads Z1 and Y1 to capacitors C7, C2, and through the lead U to the uni-selector switch 50 in the case of contact Z, and through capacitors C2 and C7 through the same lead U to the uni-selector switch 50, thus enabling the output pulses from the batch counter to be fed to the uni-selector switch.

The batch counter is further provided with per se known re-setting means comprising relay contact RL5/2, which when closed connects together the batch counter reset terminals 47c and 47d.

GENERAL DESCRIPTION OF OPERATION OF APPARATUS IN THE CASE WHERE THE BLOOM IS OF NORMAL AS OPPOSED TO ABNORMALLY SHORT LENGTH

There will now be described the mode of operation of the foregoing apparatus, with further explanation as necessary of certain details of the circuitry, for the normal case where the bloom is of normal length as opposed to abnormally short length, i.e. the length of each bloom is such that when the front end of the rolled bloom reaches the flying shears, the rear end of the bloom will extend rearwardly beyond flag switch B by a distance greater than the crop end length, i.e. as depicted in FIG. 8.

The operator first puts control switch 37 into the set up position, thus displacing set-up contacts 38a, 38b into their upper position, i.e. upwardly from the position as drawn in FIG. 10b.

The speed of rotation of the cursor 24 as indicated by the linear measurements at the periphery of dial 19, is now calibrated to the speed of advancement of the as rolled billet through the mill. This is done by the advancemen tthrough the mill of a trial bloom of the particular cross section and nominal length of the succession of blooms to be rolled. The flying shears are operated in the usual way from the mill control panel when the front end of the rolled bloom reaches the shears, operation of which effects closure of either switches A1 or A2, thus energising that relay RL1 or RL2 not already energised. Thus, as earlier described with switch 37 in the set-up position pulses are fed through its now made contacts 38b to the pulse splitter 32 to start the pulse motor 25 and commence rotation of the cursor 24 from its zero position concurrently with the operation of the flying shears to cut off the front end of a billet from the rolled bloom.

With switch 37 still in the set-up position, the next operation of the flying shears to cut off the rear end of the billet just mentioned, will, as earlier stated, energise the relay RL1, RL2 not energised by the preceding flying shears operation to break the pulse feed to motor 25 and stop the further rotation of the cursor 24. As the length of the just cut billet is known, this can be checked against the billet length reading, as displayed by the movement of the cursor from zero position 28 to position 24' in FIG. 9.

If there is a difference between the cursor billet length reading on the dial 19 and the actual length of the just cut billet, the operator can displace switch 37 to the reset position to return the cursor to zero and make an appropriate adjustment to the cursor motor speed control knob 55 and repeat the above described calibration operation with a further billet cut by the flying shears from the same trial bloom until the length measurement indicated by the cursor conforms to the length of the cut billet. Thus the cursor rotation speed now corresponds to the speed of the rolled bloom through the mill. The equipment is now set up for operation.

To facilitate the set up operation, main pulse generator 33 and pulse splitter 32 are so designed as to give a pulse frequency of 24 pulses per foot length of billet, i.e. per foot length of as rolled bloom. Such relatively high pulse frequency in relation to billet length also ensures an accuracy of cursor length indicated on dial 20 to within ½ inch, which is close enough to take care with sufficient accuracy for all practical purpose of the amount of adjustment required in the operation of the flying shears to ensure minimum scrap wastage.

After having set up the apparatus, then prior to the next bloom entering the mill, i.e., with flag switch C closed, the control switch 37 is moved into the operate position so as to displace the moving contacts of contacts 39a, 39b downwardly in the drawing. Thus the circuit through lead L (see FIGS. 10B and 11A) to relay coil RL3 is broken, which is now energised only through its at present closed hold on contact RL3/1 in series with still closed relay contact RLB/1, RLB being energised through lead F from flag switch B energised through lead N.

A bloom now enters the mill passing under flag switch C, which opens; this causes no action as flag switch C is in series with contact RL3/2 of relay RL3, which contact is held open by its still energised relay coil RL3.

The front end of the bloom advances to flag switch B, closing it to energise through lead R relay RLB (see FIG. 11), thus opening its previously closed contact RLB/3 and ensuring that no pulses are supplied at this stage from main pulse generator 33 through lead H to batch counter 47, which remains inoperative.

The energisation of relay RLB opens its contact RLB/1, which is in series with the hold on contact RL3/1 of relay RL3 to de-energise this. As a result its contact RL3/1 opens with no action, and its contacts RL3/2 and RL3/3 both close, completing in the case of RL3/2, apart from the at present open flag switch C, the common return line G to relays RL1 and RL2 (the flying shear operated relays).

The bloom now leaves flag switch C which closes, completing the common return line G to relays RL1, RL2, thus ensuring that the next cut of the flying shear will operate one of them.

With a bloom of normal length, so that the flying shears will perform their first cut on the front end of the rolled bloom before the rear end thereof leaves and thus opens flag switch B, after the rear end of the bloom has passed the flag switch C the operation of the flying shears closing either switches A1 or A2 will energise relay RL1 or RL2 respectively, thus displacing their moving contacts RL1a, RL1b or RL2a, RL2b, as the case may be to the right in FIG. 10a and through leads 46 energising the main pulse generator 33 to start the motor 25, which initiates rotation of the cursor 24 around dial 19 from its zero position, closing cam switch 44 in so doing.

As earlier stated, the pulse generator 33 is adapted to produce a large number of pulses per foot length of advancing billet, namely 24 pulses per foot length, and these pulses are fed from the pulse generator 33 along lead H in the direction of batch counter 47, but only as far as relay contact RLB/3, which has previously opened following the closure of flag switch B and energisation of relay RLB as already mentioned.

With switch 37 still in the operate position with its contacts 39a, 39b, in the reverse position to that illustrated, when the bloom leaves flag switch B causing this to open, relay RLB will be de-energised, so that all of its contacts which are self-holding will close. Closure of its contact RLB/1 has no effect, as relay contact RL3/1 in series with RLB/1 is still open.

Closure of relay contact RLB/3 now feeds pulses to the batch counter 47 and after time interval "Z" one output pulse Z feeds RL4 via capacitor C7 to energise this for a short period, thus momentarily closing the associated relay contact RL4/1 which connects via leads D and E the coils of RL1 and RL2 so that relay RL1 or RL2, whichever has not previously been energised by flying shears operation of switches A1, A2, is now energised, thus through leads 46 stopping the further movement of the motor 25 and cursor 24, i.e. following the passage of the rear extremity of the bloom past flag switch B. Thus the cursor will now read the billet length distance r as earlier explained with reference to FIGS. 8 and 9.

In this instance since no Y pulses were fed from the batch counter to the uniselector switch 50, the billet deficiency indicator 51 remains at zero.

FURTHER DESCRIPTION OF OPERATION IN THE CASE OF A SHORT LENGTH BLOOM

A short bloom passing down the mill will leave the flag switch B before the flying shear operates. The resultant opening of flag switch B de-energizes relay coil RLB, thus closing its associated contact RLB/1, which being in series with RL3/1 which is open has no effect. De-energization of relay coil RLB closes its contact RLB/3, thus as earlier described, feeding pulses to the batch counter 47 so that the resultant output pulse Z feeds relay coil RL4, closing its contact RL4/1, with no effect, as relays RL1 and RL2 are both at present de-energized. With the feeding of pulses to the batch counter 47 this after producing its initial output pulse Z thereafter produces a succession of output pulses Y.

The batch counter 47 is adapted in the known manner to reset itself after producing a predetermined number of output pulses Y. It is arranged that this number is the nominal billet length in terms of pulses, i.e. 24 times the nominal length in feet for this particular equipment. The batch counter 47 after an initial time lag corresponding to pulse Z therefore produces pulses at intervals corresponding to the time interval for shearing nominal billet lengths. This will continue until the cursor driving motor 26 stops.

The first flying shear cut to occur now operates either relay RL1 or RL2, thus in the way earlier described, the cursor driving motor 26 is started and the cursor 24 advances round the dial 20 until a batch counter output pulse Y, operating relay RL4 via capacitor C2, causes the other not yet operated flying shears relay RL1, RL2 now to be energised through contacts RL4/1 stopping the motor 26 and interrupting the output of pulses to the batch counter 47.

Thus the dial 20 indicates the expected tail end crop in the normal manner. It is convenient to count the number of billets by which the signal from the flag switch B has been delayed as this indicates the deficiency in the number of billets that will be cut from that particular short bloom which must be taken into account in applying the usable billet length correction to the number of billets still to be cut. It is therefore arranged for the number of times the batch counter 47 operates to produce Y pulses, before RL4 stops the motor 26, to be counted by pulsing the uniselector 50, one bank of which feeds the digital display counter 51, which counts and displays from 0–9 this deficiency number of billets.

AUTOMATIC RE-SET OPERATION

Referring to FIGS. 10, 10a and 10b, an automatic reset facility is provided to avoid the necessity for the operator to perform the above described series of operations every time the equipment is used. This comprises a timer motor 48 the shaft of which carries four cam switches 49a, 49b, 49c, 49d of known form and arranged in the circuit depicted in FIG. 10. This reset facility operating in the following manner:

Control switch 37 is put into the reset position so that its contacts are in the position actually depicted in FIG. 10b. An auto reset switch 48a which is in series with the timer motor 48 and flying shears relay contact RL2b is closed. The control switch 37 is put into the operate position and the billet length correction operation above described is carried out. Thus, when both relays RL1 and RL2 are energised with relay contact RL2b which is in circuit with switch 48a now closed, the timer motor commences to operate. The following associated sequences occur:

(a) Cam operated switch 49a closes after a time interval determined by the rate of rotation of the timer motor shaft, e.g. after two seconds, to provide a continuous current supply to the timer motor 48, independent of relay RL1 and RL2, from main supply terminal 53, until the cam switch 49a is again opened by continued further rotation of the timer motor shaft, namely after a time interval of 30 seconds from the start of operation of the timer motor.

(b) Cam switch 49b closes after 20 seconds of timer motor running time for one second only, completing the fast reset pulse line to the cursor driving motor 25, which starts to run if the cam switch 44 operated by the motor shaft 26 when in the zero position (or just beyond) is open. The object of this sequence is to condition the circuit ready for operation, of motor 25 irrespective of any back lash between motor shaft cam dwell 41 and the detent 42 on the operating member 43 of the associated cam switch 44.

The motor 25 will stop as the cam switch 44 closes since RLW is operated when the cursor 24 comes out of the zero position, or if already out of the zero position, relay contacts RLW/1 in series with cam switch 49b and which are held open prevent the motor 25 running.

(c) Cam 49c now closes at 22 seconds after the start of the timer motor for a period of six seconds and the cursor motor 25 will now run, i.e. will be re-set by fast pulses as earlier mentioned until the cursor 24 enters the zero position and RLW is unenergised and its contacts RLW/1 open the circuit for the motor re-set fast pulses.

(d) Cam 49d opens for one second only at 28 seconds after start of the timer motor, opening the common return line to RL1 and RL2, thus their hold on contacts are released and they are re-set ready for the next operation. They effect of releasing the hold on contacts of relays RL1 and RL2 so that the contacts return to the position shown FIG. 10a is through auto switch 48a to break the supply line to, and thus to stop, the timer motor 48. When RL1 and RL2 release they break one of the mains feeds to the timer motor so that only cam contacts 49a feed the motor and control its operation as stated in paragraph (a) above.

Provision is made after each bloom is rolled for resetting the batch counter, so as to return the billet deficiency indicator to its initial zero position. This is obtained by the aforementioned simultaneous re-setting of the contacts of relays RL1 and RL2, by the performance of sequence (d) above mentioned. This simultaneous re-setting of the two relay contacts causes a voltage drop, which in practice may be 24 volts, to occur in lines D and E respectively connected to RL1 and RL2. These two lines (see FIG. 11) are connected to one shot multivibrators formed respectively by the pair of transistors T1, T2 and the pair of transistors T3, T4, each pair being respectively connected to transistors T5, T6. When both pairs of transistors T1, T2, T3, T4 are simultaneously subjected to the same voltage drop, the similar pulses therefrom cause transistors T5, T6 to conduct at the same time. The effect of this is to energise relay RL5 whose contacts RL5/1 energise the uniselector operating relay coil 54 causing the uniselector switch arm 50 to home onto its dead contact 500, thus the switch arm 51a of the billet deficiency indicator 51, returns to its zero position 510. At the same time the contacts RL5/2 of relay RL5 close to connect together the batch counter re-set terminals 47c and 47d, thus re-setting the batch counter.

In FIG. 10, the leads marked a to j inclusive and m may be connected to a printing device not shown for recording the performance of the apparatus.

Although the invention has been described as applied to the rolling of blooms into billets, it is similarly applicable to the rolling of billets into bars.

I claim:

1. A method of controlling the severing from a succession of blooms or billets to a predetermined acceptable length of the second and subsequent batches of a succession of severed billets or bars after rolling in a hot rolling mill, said method comprising the steps of:
   (a) advancing the first of a succession of blooms or billets through the mill and cutting therefrom by flying shears one or more billets or bars of predetermined length,
   (b) measuring such as-rolled billet or bar length on an indicating device, so as to calibrate the indicating device for length measure of the as-rolled bloom or billet in relation to the particular cross-section and speed of advancement of the succession of blooms or billets to be rolled, and
   (c) during the rolling of the next successive bloom or billet, utilising said calibrated indicating device both to measure the as-rolled rear crop end length of the bloom or billet and to vary the length of each rolled billet or bar cut by the flying shears, so as to increase or decrease within the acceptable limits, the length of at least the billets or bars last cut by the flying shears from the rolled billet or bar according to whether the as-rolled rear end length of such bloom or billet is less than or greater than the acceptable billet or bar length, so as in the rolling of each successive bloom or billet to obtain the maximum number of sound billets or bars of acceptable length with the minimum amount of wastage.

2. A method according to claim 1, characterised by the further step of initiating a rear crop end length measuring operation following the operation of the flying shears and the passage of the rear extremity of the bloom or billet past the first of two successive positions at the rear or entrance end of the mill and of stopping the operation of said length indicating device following the passage of the rear extremity of the rear crop end past the second of said two successive positions at the rear end of the mill.

3. A method according to claim 2, characterised by the further step of measuring for each successive bloom or billet the rear crop end length as an arithmetic sum of the length of the part of the as-rolled bloom or billet, which is to the rear of the second of said two successive positions at the instant that the flying shears makes a cut on the rolled bloom or billet at or near the front end thereof, and the distance between such second position and the nearest end of the last billet or bar still to be cut off by the flying shears.

4. Apparatus for controlling the severing by flying shears of billets or bars rolled in a hot rolling mill from a succession of blooms or billets respectively, said apparatus comprising:
   (i) an indicating device arranged to measure and indicate the as-rolled length of the rear crop end of a bloom or billet, advanced through a hot rolling mill,
   (ii) means responsive to billet or bar advancement for initiating rear crop end length measuring operation of the indicating device following the operation of the flying shears and the passage of the rear extremity of the bloom or billet past the first of two successive positions at the rear or entrance end of the mill, and each spaced a predetermined distance from the operative position of the flying shears,
   (iii) means responsive to the passage of the rear extremity of the rear crop end past the second of said two successive positions at the rear or entrance end to the mill, for stopping the operation of said length measuring device, so as thereby to measure the rear crop end length expressed as billet or bar length,
   (iv) means for controlling subsequent flying shears cutting operations on the same rolled bloom or billet to adjust by increase or decrease within the acceptable limits subsequent billet or bar lengths, cut from the same rolled bloom or billet and according to whether the indicated as-rolled rear crop end length is less than or greater than the acceptable severed billet or bar lengths.

5. Apparatus for controlling the severing by flying shears of billets or bars rolled in a hot rolling mill from a succession of blooms or billets respectively, said apparatus comprising:
   (i) an indicating device embodying a scale carrying member graduated in length units together with a cursor cooperating with said scale carrying member,
   (ii) said scale carrying member and cursor, being relatively movable in response to linear advancement of the rolled billet or bar,
   (iii) means for starting relative movement of the scale carrying member and cursor following the commencement of the operation of the flying shears and the passage of the rear extremity of the bloom or billet past the first of two successive positions at the rear or entrance end of the mill and each spaced a predetermined distance from the operative position of the flying shears,
   (iv) means responsive to the passage of the rear extremity of the bloom or billet past the second of said two successive positions at the rear or entrance end of the mill for stopping said relative movement between the scale carrying member and cursor, so that said cursor in relation to the scale carrying member indicates the as-rolled length of a rear end portion of the bloom or billet, and
   (v) means on the scale carrying member for denoting, having regard to such rear end length, and in relation to the number of billets or bars of a predetermined length still to be severed from the bloom or billet, the extent of adjustment of the flying shear operation required to cut, with the minimum of crop end waste, the maximum number of acceptable lengths of billets or bars from the remaining length of the advancing bloom or billet.

6. Apparatus according to claim 5, characterised in that the indicating device is adapted to indicate the rear crop end length as an arithmetic sum of the length of the part of the as-rolled bloom or billet, which is to the rear of the second of said two successive positions, at the instant that the flying shears makes a cut on the rolled bloom or billet at or near the front end thereof, and the distance between such second position and the nearest end of the last billet or bar still to be cut off by the flying shears.

7. Apparatus according to claim 6, wherein the distance between the second of said two successive positions and the nearest end of a billet or bar still to be cut is indicated by displacement of the scale carrying member, and the distance between the second of said two successive positions and the rear extremity of the rear crop end of the bloom or billet is indicated by the cursor.

8. Apparatus according to claim 6, wherein the scale carrying member is in the form of a dial and the latter and the cursor are mounted for relative rotational movement with the dial being provided with billet or bar length markings extending around the axis of relative rotation of the dial and cursor.

9. Apparatus according to claim 6 wherein the cursor is provided with a series of markings spaced along the length of the cursor, which denote the nature of adjustment to the flying shears necessary to absorb the rear crop end length of the bloom or billet for different numbers of billets or bars respectively to be cut and the scale carrying member is in the form of a dial and the latter and the cursor are mounted for relative rotational movement with the dial being provided with billet or bar length markings extending around the axis of relative rotation of the dial and cursor with means on the dial indicating such different number of billets or bars to be cut.

10. Apparatus according to claim 6 wherein the scale carrying member is in the form of a dial and the latter and the cursor are mounted for relative rotational movement with the dial being provided with billet or bar length markings extending around the axis of relative rotation of the dial and cursor and the indicating device embodies a second dial similar to the first mentioned dial and provided with markings similar to those provided on the first mentioned dial, said second dial being rotatable relative to the first mentioned dial about the axis of relative rotation of the latter and of the cursor, with the two dials being disposed one behind the other and the front dial being transparent.

11. Apparatus according to claim 5, wherein means are provided for calibrating the relative movement of the cursor and the scale carrying member in accordance with the length of billets or bars as cut from a rolled bloom or billet fed through the mill.

12. Apparatus according to claim 4 wherein the indicating device is actuated by means of an electric circuit embodying a pair of switches disposed one at each of said two positions at the rear or entrance end of the mill, and co-operating with switch means actuated by successive operations of the flying shears in energising an electric motor for actuating billet or bar length indication of the indicating device, one of the two switches of the pair which is furthest from the entrance end of the mill being normally closed switch opened only by the presence of an advancing bloom or billet, and the other switch of the pair and which is nearer to the entrance end of the mill being a normally open switch closed only by the presence of an advancing bloom or billet, the arrangement being such that following the advancement of the rear end of the bloom or billet past the normally closed switch to effect its closure, the next operation of the flying shears actuates its associated switch means to effect energisation of the electric motor to commence rear end billet or bar length indicating movement of the indicating device, said normally open switch being arranged to stop the electric motor on the opening of said latter switch following the passage of the rear end of the bloom or billet to be rolled.

13. Apparatus according to claim 12, wherein the said pair of switches each comprises a bloom or billet engaging flag switch respectively displaced by engagement with an advancing bloom or billet.

14. Apparatus according to claim 4 including means for feeding billet or bar length pulses into a controlling electric circuit at time intervals corresponding to the nominal length of each billet or bar to be cut from the advancing rolled bloom or billet, and means for delaying the first of a series of such pulses by a time interval of a further pulse corresponding to the distance between said second predetermined position at the rear or entrance end of the mill and the nearest end of a billet or bar of nominal length to be cut from the rolled bloom or billet and by said billet or bar length pulses stopping further indicating movement of said indicating device.

15. Apparatus according to claim 14, including means for indicating a deficiency in the number of billets or bars cut from a rolled bloom or billet, where the number cut is less than the number cut to the same length from a bloom or billet of the normal length, for which the apparatus is designed.

16. Apparatus according to claim 4, including means for operating the indexing device automatically at the initiation of the rolling of each of a succession of blooms or billets of a batch of blooms or billets to be rolled.

References Cited

UNITED STATES PATENTS

| | | | |
|---|---|---|---|
| 2,958,243 | 11/1960 | Foster | 83—287 |
| 3,020,788 | 2/1962 | Peters | 72—203 |
| 3,174,316 | 3/1965 | Sigal | 72—203X |
| 3,178,974 | 4/1965 | Roess | 83—387X |

MILTON S. MEHR, Primary Examiner

U.S. Cl. X.R.

72—203; 83—287